US006959334B1

(12) United States Patent
Massengill

(10) Patent No.: US 6,959,334 B1
(45) Date of Patent: Oct. 25, 2005

(54) BACKUP LOGICAL PORT SERVICE

(75) Inventor: David E. Massengill, Atlanta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 776 days.

(21) Appl. No.: 09/952,431

(22) Filed: Sep. 14, 2001

(51) Int. Cl.[7] .................. G06F 15/173; G06F 15/16
(52) U.S. Cl. ............... 709/223; 709/227; 709/224; 709/230
(58) Field of Search ............... 709/220, 223, 709/224, 226, 227, 230, 249; 370/395.5, 370/90.1; 718/102, 103, 106

(56) References Cited

U.S. PATENT DOCUMENTS

| | | | | |
|---|---|---|---|---|
| 6,101,542 | A * | 8/2000 | Miyamoto et al. | 709/227 |
| 6,421,705 | B1 * | 7/2002 | Northrup | 709/203 |
| 6,625,651 | B1 * | 9/2003 | Swartz et al. | 709/226 |
| 6,667,971 | B1 * | 12/2003 | Modarressi et al. | 370/352 |
| 6,687,748 | B1 * | 2/2004 | Zhang et al. | 709/223 |
| 6,718,378 | B1 * | 4/2004 | Machida | 709/223 |
| 6,732,167 | B1 * | 5/2004 | Swartz et al. | 709/223 |
| 6,779,000 | B1 * | 8/2004 | Northrup | 707/200 |
| 6,785,279 | B1 * | 8/2004 | Crooks | 370/392 |
| 6,813,278 | B1 * | 11/2004 | Swartz et al. | 370/466 |
| 6,836,803 | B1 * | 12/2004 | Swartz et al. | 709/227 |

\* cited by examiner

*Primary Examiner*—Majid Banankhah
(74) *Attorney, Agent, or Firm*—Merchant & Gould

(57) ABSTRACT

Backup logical port service is provided by associating permanent virtual circuit (PVC) descriptions of a primary management information base (MIB) for a primary physical circuit with a service name that is also associated with a backup management information base and corresponding backup physical circuit. Switching from primary to backup service results in the PVC builds in the MIB for the primary circuit being established in the MIB for the backup circuit through association with the service name, rather than having an independently built set of PVCs in the backup MIB that may be error prone. Additionally, the backup service may be a full backup of all PVCs built to the primary service or a partial backup. Backup service may be configured and triggered by a terminal in communication with the management server, including client devices of customers accessing the management server through the Internet.

23 Claims, 8 Drawing Sheets

| CIRCUIT NAME | SWITCH A | BASE LPORT NAME | SIA | PtA | IF_A | DLCIA | SWITCH B | TO LPORT NAME | SIB | PtB | IF_B | DLCIB |
|---|---|---|---|---|---|---|---|---|---|---|---|---|
| xxxyyy | aabb | abc xyz | 11 | 1 | 147 | 253 | aabc | abc def | 3 | 1 | 39 | 200 |
| xxxzzz | aabb | abc xyz | 11 | 1 | 147 | 249 | aabd | abc ghi | 3 | 1 | 160 | 400 |
| xxxwww | aabb | abc xyz | 11 | 1 | 147 | 250 | aabc | abc jkl | 3 | 1 | 82 | 400 |
| ... | ... | ... | ... | ... | ... | ... | ... | ... | ... | ... | ... | ... |

FIG.2

BACKUP LOGICAL PORT SERVICE

TECHNICAL FIELD

The present invention relates to data networks with logical ports that transfer data through virtual circuits. More particularly, the present invention relates to providing backup logical port service for one or more virtual circuits.

BACKGROUND

Networks such as frame relay clouds include interconnected network devices, such as switches, that channel data packets between a source location and a destination. The switches are assigned a logical port (LPort) address by a network management server that orchestrates the operations of the network. In a frame relay cloud, the network management server provides routing information to the switches enabling the switches to route a data packet with a particular header address to an appropriate LPort as specified in the routing information. The network management server groups information including the routing and LPort information for network data paths of a particular host in a management information base (MIB).

The data packets from a host are delivered to the network cloud through a physical connection such as a T1 line that links to a switch of the network. The remote device that communicates with the host through the network cloud also has a physical connection to a switch of the network. The communication path between the host and the remote device that passes through the network cloud is known as a virtual circuit. In frame relay, a permanent virtual circuit (PVC) exists because the switch of the host's physical circuit always sends and receives data packets through the same path leading to the switch of the remote's physical circuit.

The physical circuit between the host or remote device and the LPort is susceptible to failure. Therefore, it is desirable to provide a backup physical circuit to establish the LPort should the primary physical circuit fail. Ideally, the LPort of the backup physical circuit, when activated by the management server, provides some or all of the PVCs that were provided by the LPort of the primary physical circuit. However, conventional setup of the backup LPort service requires that every PVC built to the primary physical circuit's MIB be separately built to the backup physical circuit's MIB.

Building PVCs to a MIB requires that several pieces of information for each PVC be correctly entered into the management server that controls the operation of the switches of the primary and backup physical circuits. One particular host may have hundreds of PVCs or more extending to hundreds of remote devices. Building the backup service for the host can take many hours and becomes very tedious. One incorrect entry for the MIB of a backup physical circuit can cause one or more PVCs of the backup service to be inoperable. If a backup PVC is inoperable, a technician must scan the PVC entries for the backup MIB to find the incorrectly built PVC.

Hosts using frame relay, such as bank mainframes communicating with remote automatic teller machines, often cannot afford the downtime necessary to test the PVC builds of the backup physical circuit prior to its activation. The downtime necessary to repair the primary physical circuit or correct entries for the backup service is also unaffordable. The efficacy of the backup LPort service is vital in such cases, and an incorrectly built PVC in the backup service can become costly once backup service is necessary.

Therefore, there is a need in the art for a method of creating backup LPort service without individually rebuilding every PVC of the primary physical circuit that is desired for the backup physical circuit.

SUMMARY

Embodiments of the present invention provide backup LPort service by associating the PVC builds of the primary physical circuit's MIB to a service name that is also associated with the backup physical circuit's MIB. The network management server contains the LPort information describing the PVC builds of the primary circuit and groups the information to the service name. When the primary physical circuit is active, the PVC definitions of the primary circuit's MIB are established through the primary physical circuit. When the backup physical circuit is active, the PVCs defined in the backup circuit's MIB through association with the service name are established through the backup physical circuit. The backup service may establish all PVCs of the physical circuit or a subset. Since the PVC builds for the primary physical circuit are linked through the service name to the backup physical circuit, it is unnecessary to manually build a duplicate set of PVCs for the backup circuit, and the risk of incorrect PVC builds for the backup service is eliminated.

The system for providing backup LPort service includes a management server that maintains the MIBs for the primary and backup circuits. The primary circuit's MIB contains the LPort information describing the PVCs that are grouped to a service name. A primary physical circuit in communication with the management server establishes the PVCs grouped to the service name when primary LPort service is activated by the management server. A backup physical circuit in communication with the management server establishes the PVCs defined in the backup physical circuit's MIB through association to the service name when backup LPort service is activated by the management server.

The LPort information grouped to the service name may be a subset of the LPort information describing the PVCs of primary LPort service. The primary physical circuit establishes the PVCs described by all of the LPort information when activated by the management server. The backup physical circuit establishes the PVCs described by the subset of LPort information grouped to the service name when activated by the management server.

The various aspects of the present invention may be more clearly understood and appreciated from a review of the following detailed description of the disclosed embodiments and by reference to the drawings and claims.

DESCRIPTION OF THE DRAWINGS

FIG. 2 shows an example of logical port information of a MIB describing a set of PVCs.

DETAILED DESCRIPTION

Figure 1:
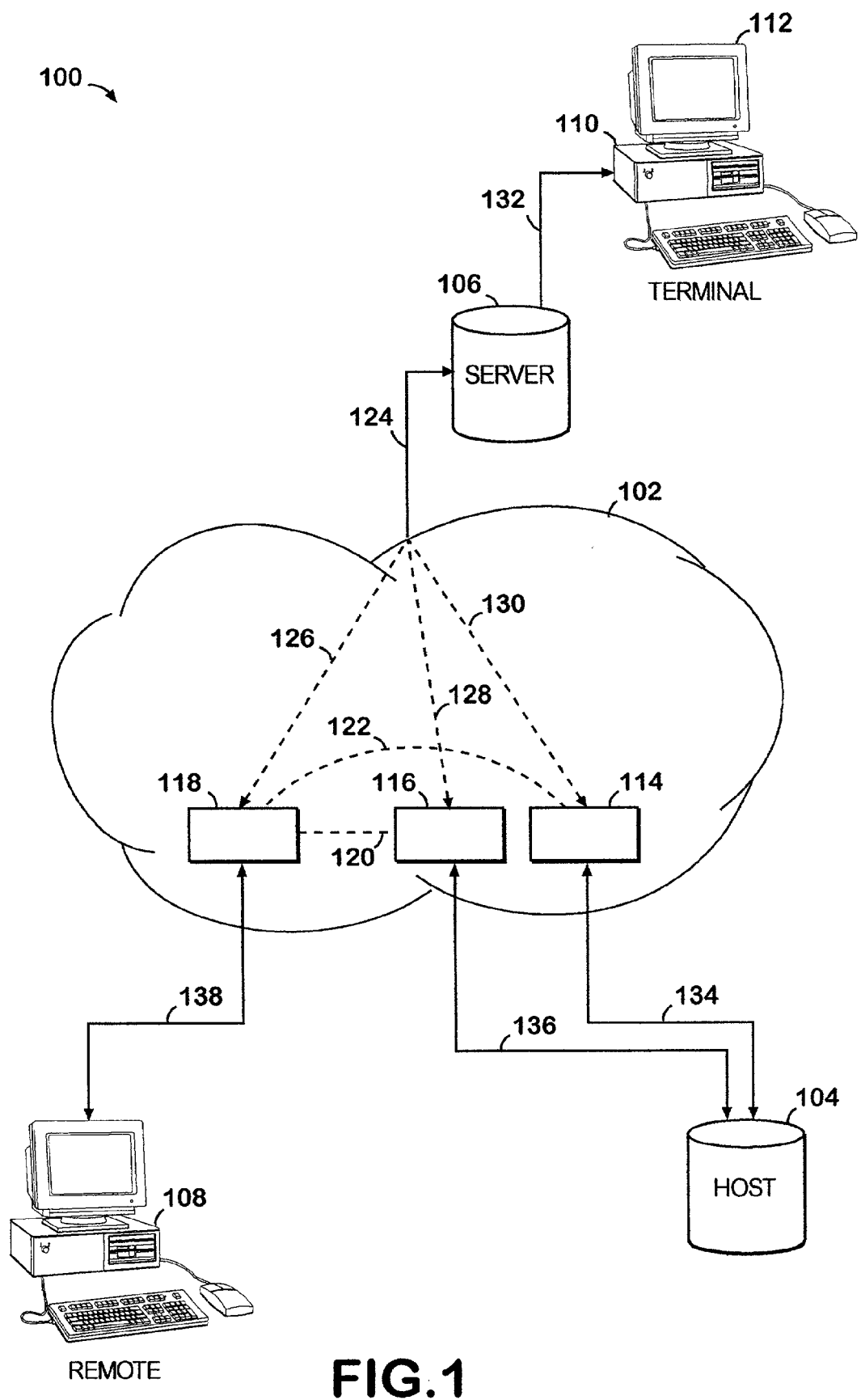
FIG. 1 shows a frame relay cloud and management system.

FIG. 1 shows a network 100 that includes a network cloud 102, such as frame relay, and a management server 106 in communication with the network cloud 102. The network cloud 102 includes several network devices, such as switches 114, 116, and 118. The switches 114, 116, and 118 are interconnected so as to form selectable data paths through the network cloud 102. For example, one data path 122 is established between a port of switch 114 and a port of switch 118 while another data path 120 is established between a port of switch 116 and a port of switch 118.

The management server 106 communicates with the network devices through a management trunk 124 that forms a communication path 126 to switch 118, a communication path 128 to switch 116, and a communication path 130 to switch 114. The management server 106 maintains the MIBs, discussed in more detail with reference to FIG. 2, responsible for defining the PVCs established through the network cloud 102. The management server communicates with a user terminal 110 through a network connection 132 that is typically part of a local area network (LAN). The user terminal 110, with display screen 112, allows a technician to interface with the MIB information for the network cloud 102.

A host device 104 communicates through the network cloud 102 with a remote device 108. The host device 104 sends and receives data through a primary physical circuit 134 that establishes an LPort through a port of switch 114. A port of switch 114 is configured by a MIB of management server 106 to act as the LPort for primary physical circuit 134. The MIB of management server 106 creates a PVC between the host 104 and remote device 108 by describing the PVC as path 122 between switch 114 and switch 118. The remote device 108 communicates with the network cloud 102 through a physical circuit 138 connected to switch 118.

The host device 104 has subscribed to backup LPort service, and a backup physical circuit 136 is in place to provide a communication path between the host 104 and a switch 116 that establishes the backup LPort. The backup LPort of switch 116 establishes the PVC, as described in a MIB of server 106 corresponding to the backup physical circuit 136, between the host 104 and the remote device 108 through communication path 120 that leads to switch 118. The backup physical circuit 136 thereby provides redundancy for the PVC between host device 104 and remote device 108 so that the backup physical circuit 136 can handle all duties of the primary physical circuit 134 once the primary physical circuit fails.

FIG. 2 shows an example of logical port information of a MIB 200 containing entries for an LPort for a particular host having several PVCs leading to several remote devices. The entries include values for several parameters that describe the PVC. The first parameter 202 includes the name assigned to the PVC (e.g., xxxyyy). The second parameter 204 includes the name assigned to the switch (e.g., aabb) that provides the LPort establishing the PVC. The third parameter 206 includes the name of the LPort (e.g., abcxyz) assigned for the physical circuit of the host. As can be seen, the MIB entries for a host contain the same switch name and the same LPort name indicating that all PVCs for the host are established through the same LPort of the same switch.

The fourth parameter 208 defines the card slot (e.g., 11) of the switch where the port for the near end physical circuit connection is located. The fifth parameter 210 defines the port location (e.g., 1) of the physical circuit connection for the card slot defined by the fourth parameter 208. The fourth parameter 208 and fifth parameter 210 are automatically populated by the management server in response to a specification of the near end logical port name 206 for the PVC.

The PVC communication path is specifically defined by the sixth and seventh parameters. The sixth parameter (IF_A) 212 identifies the particular MIB (e.g., 147) that defines the PVCs of the LPort. As PVC descriptions for one MIB 200 are shown, all IF_A values of FIG. 2 are the same. The seventh parameter (DLCIA) 214 is the data link connection identifier (e.g., 147) of a PVC instance of the MIB, and defines the near end of the PVC communication path in the network cloud.

The eighth parameter 218 provides the name of the switch (e.g., aabc) at the far end of the PVC where the remote device is linked to the network cloud. The ninth parameter 220 defines the LPort name (e.g., abcdef) for the switch's connection to the remote device. The tenth parameter 222 defines the card slot of the switch (e.g., 3) where the port for the far end physical circuit connection is located. The eleventh parameter 224 defines the port location (e.g., 1) of the physical circuit connection for the card slot defined by the tenth parameter 222. As with the near end, the tenth parameter and eleventh parameter 224 are automatically populated by the management server in response to an identification of the far end logical port name 220.

The twelfth parameter (IF_B) 226 provides the identity of the particular MIB (e.g., 39) of a management server that defines the particular PVC for sending data from the remote device to the host. The thirteenth parameter (DLCIB) 228 is another data link connection identifier (e.g., 200) of the PVC instance of the MIB, and defines the far end of the PVC communication path in the network cloud.

Figure 3:
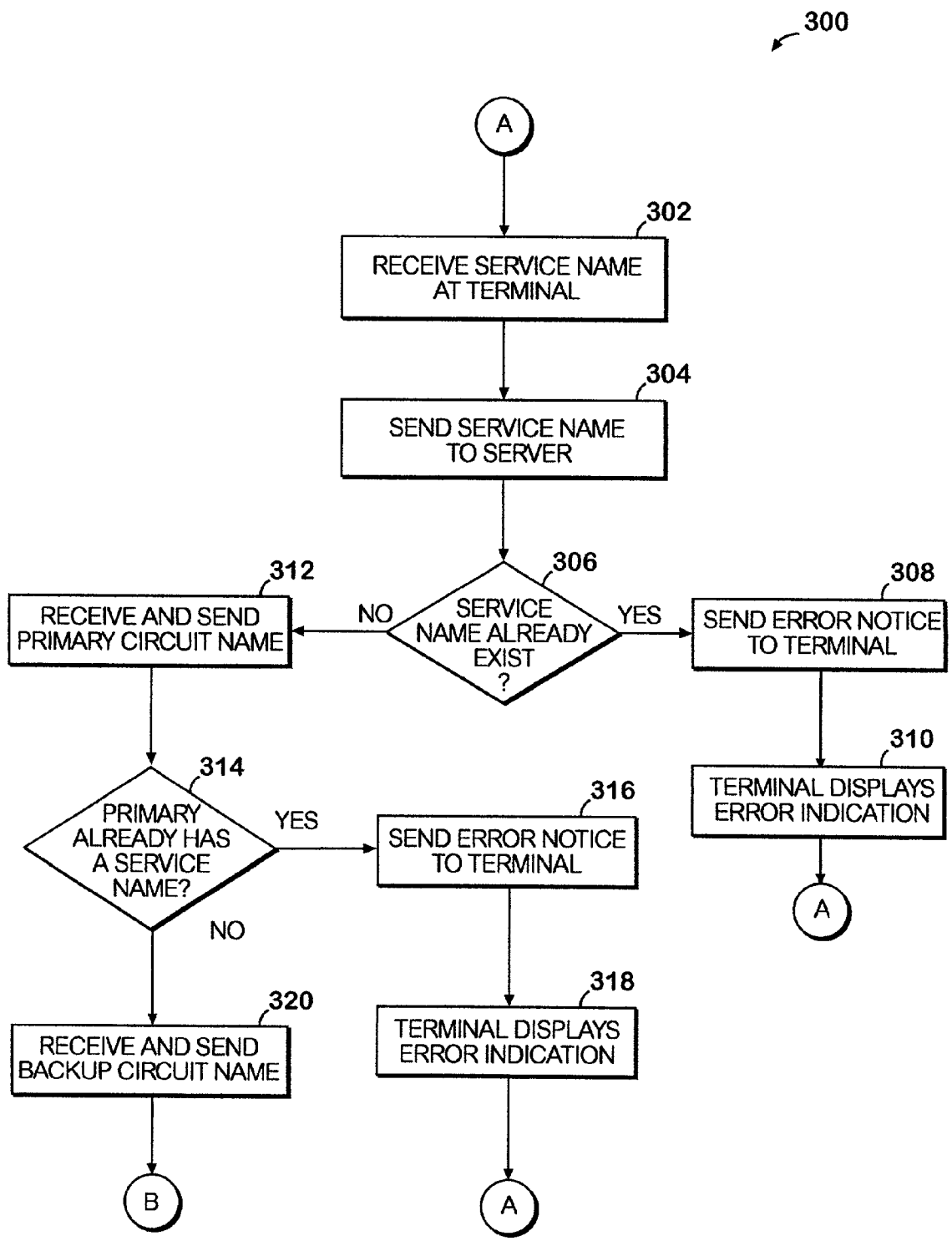
FIG. 3 is a first portion of an operational flow for configuring backup LPort service.
Figure 6:
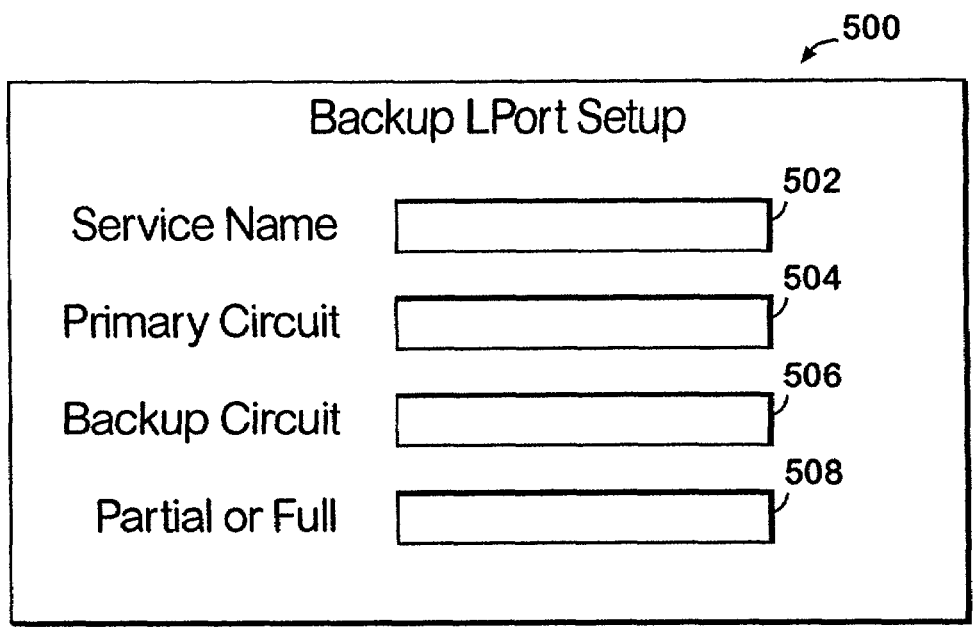
FIG. 6 is an exemplary screenshot for receiving backup service information in accordance with the operational flow of FIG. 3.

FIG. 3 shows a first portion of the operational flow of the process 300 for configuring backup LPort service which occurs after the primary service and its PVCs have already been built to the primary MIB of the management server 106. The process 300 begins at receive operation 302 where the screenshot 500 of FIG. 6 is displayed at the terminal 110. The user enters the service name for the backup service into the entry field 502 of the display 500 at receive operation 302. The terminal 110 then transmits the service name to the management server 106 at send operation 304. The management server 106 then detects whether the service name already exists for existing MIBs at query operation 306.

Figure 7:
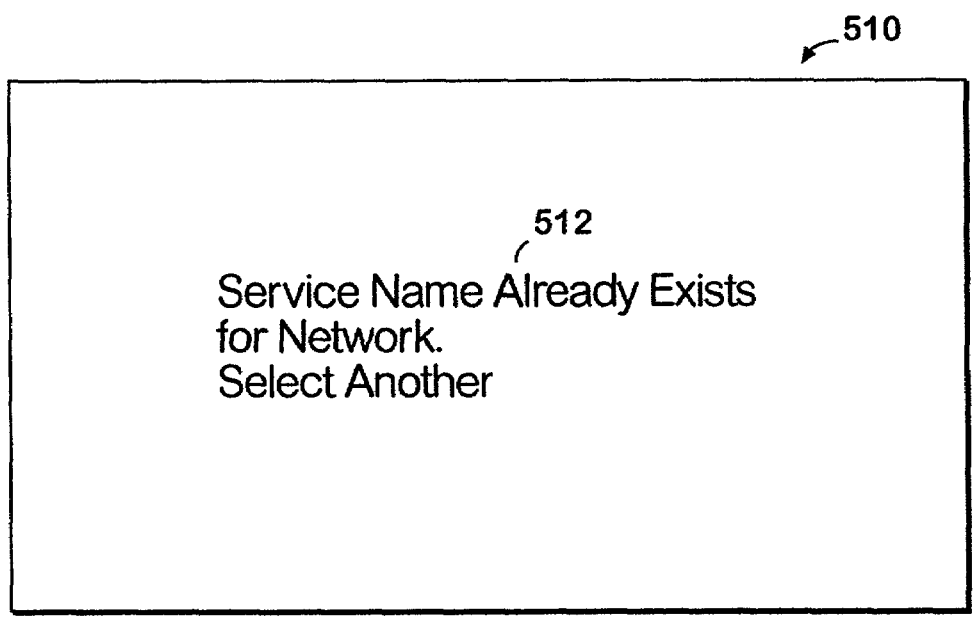
FIG. 7 is an exemplary screenshot for providing a service name error indication in accordance with the operational flow of FIG. 3.

If query operation 306 detects that the service name already exists, then operational flow transitions to send operation 308 where the management server 106 sends an error indication to the terminal 110. At display operation 310, the terminal 110 displays the error indication, such as the message 510 of screenshot 510 in FIG. 7. If query operation 306 detects that the service name does not already exist, then the terminal 110 receives the primary circuit name (LPort name) from the user in entry field 504 of FIG. 6 at receive operation 312 and sends it to the management server. The management server 106 then detects whether the primary circuit's MIB already has a service name associated with it at query operation 314.

Figure 8:
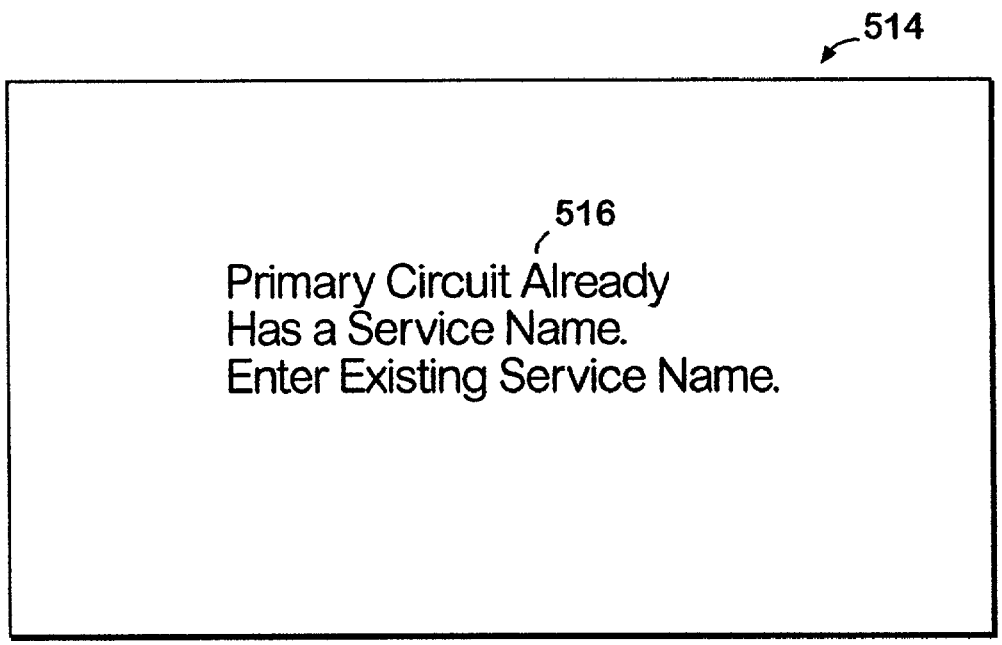
FIG. 8 is an exemplary screenshot for providing a primary circuit error indication in accordance with the operational flow of FIG. 3.

If query operation 314 detects that the primary circuit's MIB already has a service name associated with it, then an error notice is provided to the terminal 110 at send operation 316. The terminal 110 then displays the error indication, such as the message 516 of screenshot 514 in FIG. 8 at display operation 318. If query operation 314 detects that the primary circuit does not already have a service name associated with it, then the terminal 110 receives the backup circuit name from the user in entry field 506 at receive operation 320 and sends it to the management server 106. Operational flow then continues to query operation 322 of FIG. 4 where the management server 106 detects whether the backup circuit exists in the network, such as by referencing the MIB corresponding to the specified backup circuit.

Figure 9:
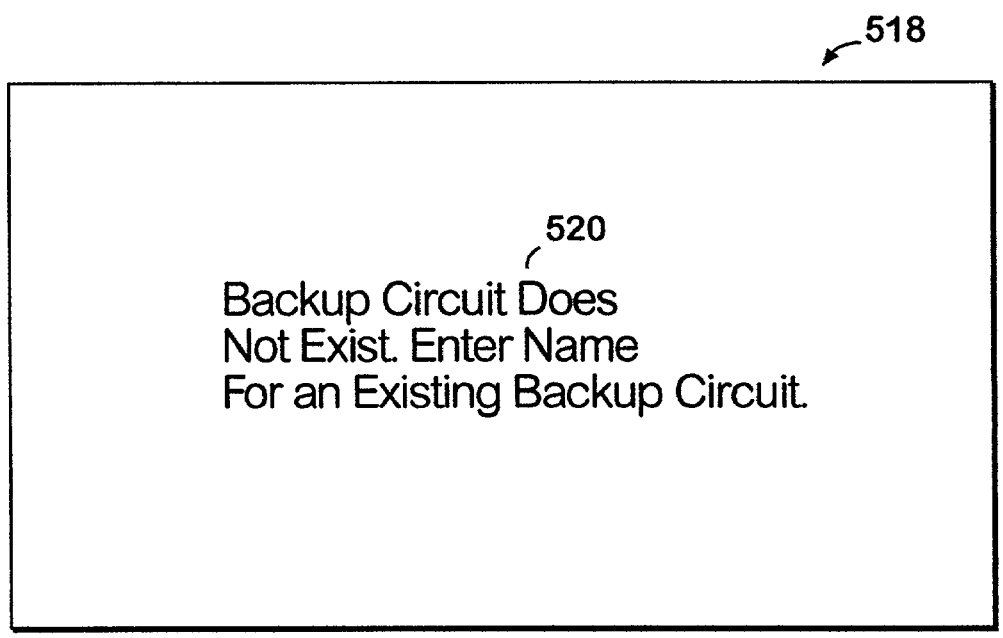
FIG. 9 is an exemplary screenshot for providing a non-existent backup circuit error indication in accordance with the operational flow of FIG. 4.

If the backup circuit does not exist, then the management server 106 sends an error indication to the terminal 110 at send operation 324. The terminal then displays the error indication, such as the message 520 of screenshot 518 in FIG. 9 at display operation 326. If the backup circuit does exist, then the management server 106 detects whether the backup circuit already has working PVCs at query operation 328, again by referencing the backup physical circuit's MIB. If the backup physical circuit does have working PVCs, then the management server 106 sends an error indication to the terminal 110 at send operation 330. The terminal 110 then displays the error indication, such as the message 524 of screenshot 522 in FIG. 10 at display operation 332.

If the management server 106 detects that the backup physical circuit does not have working PVCs, then the terminal 110 receives the backup option selection for a full or partial backup in entry field 508 of FIG. 6 at receive operation 334. The terminal 110 or management server 106 then detects from the selection whether the user wants a full or partial backup at query operation 336. If a full backup (i.e., all PVCs of the primary circuit) is desired, then at backup operation 338 the management server 106 associates all PVCs built to the primary MIB to the service name so that the PVC builds are now automatically built to the backup MIB corresponding to the backup physical circuit by altering the LPort name and port position. The DLCIA and all of the far end information for the PVCs stays the same for the full backup service. If a partial backup selection is obtained at receive operation 334 so that query operation 336 detects a partial backup, then PVCs to be backed up are selected by the user at receive operation 340.

Figures 10, 11:
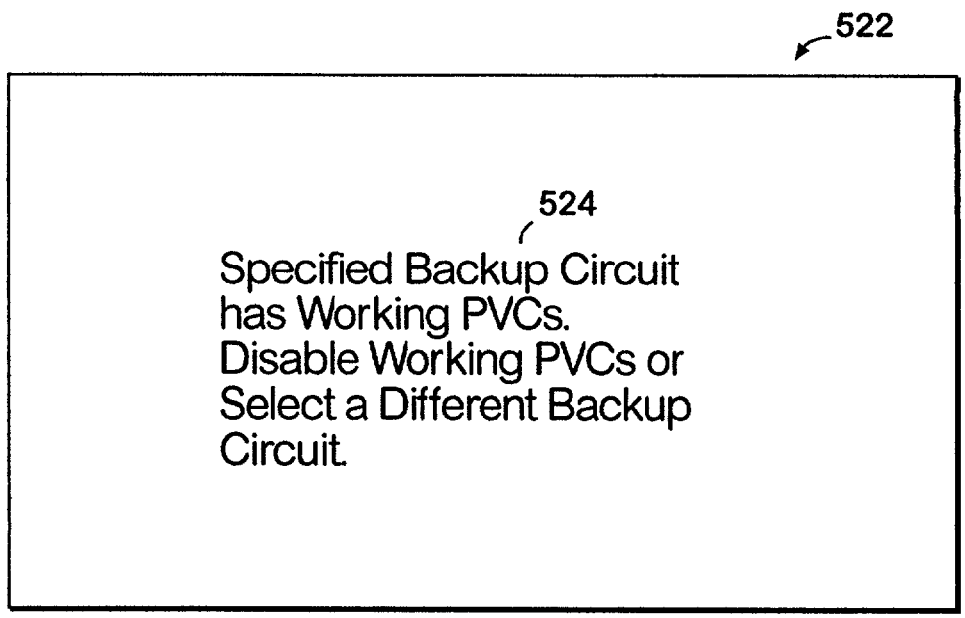
FIG. 10 is an exemplary screenshot for providing a working backup error indication in accordance with the operational flow of FIG. 4.
FIG. 11 is an exemplary screenshot for receiving partial backup selections in accordance with the operational flow of FIG. 4.

At receive operation 340, the screenshot 526 of FIG. 11 is displayed at the terminal 110. The screenshot 526 displays a listing of the PVCs built to the primary MIB. The exemplary listing in FIG. 11 contains the name 528 of each PVC, the name 540 of the near end switch of the PVC, the LPort name 542 of the near end switch, and additional information 544 such as the DLCIA, DLCIB, and the far end LPort name.

The listing of screenshot 526 allows the user to select the PVCs to be backed up. For example, a user may prefer to only backup the most important PVCs to conserve the bandwidth being provided by the backup physical circuit. At the receive operation 340, the user may alter any parameters such as the far end LPort name and DLCIB for the backup LPort service if desired, such as in the case where data needs to be redirected to a different location while backup is active. At backup operation 342 after receiving the PVC selections and/or alterations, the management server 106 associates all selected PVCs to the service name previously entered for the backup service so that the selected PVC builds are now automatically built to the backup MIB corresponding to the backup physical circuit by altering the LPort name and port position. The DLCIA and all of the far end information for the selected PVCs stays the same for the partial backup service.

Figure 4:
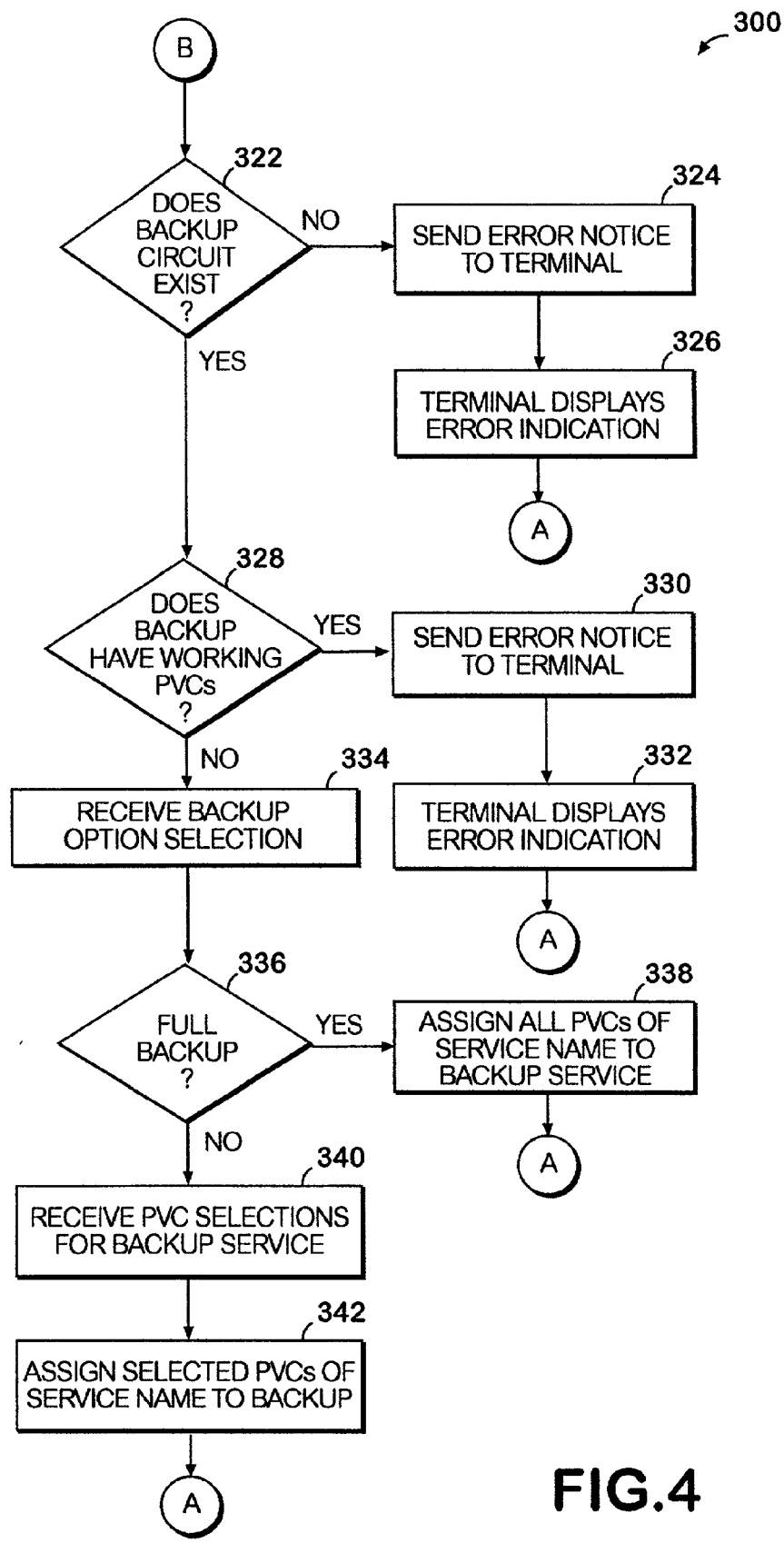
FIG. 4 is a second portion of an operational flow for configuring backup LPort service.
Figure 5:
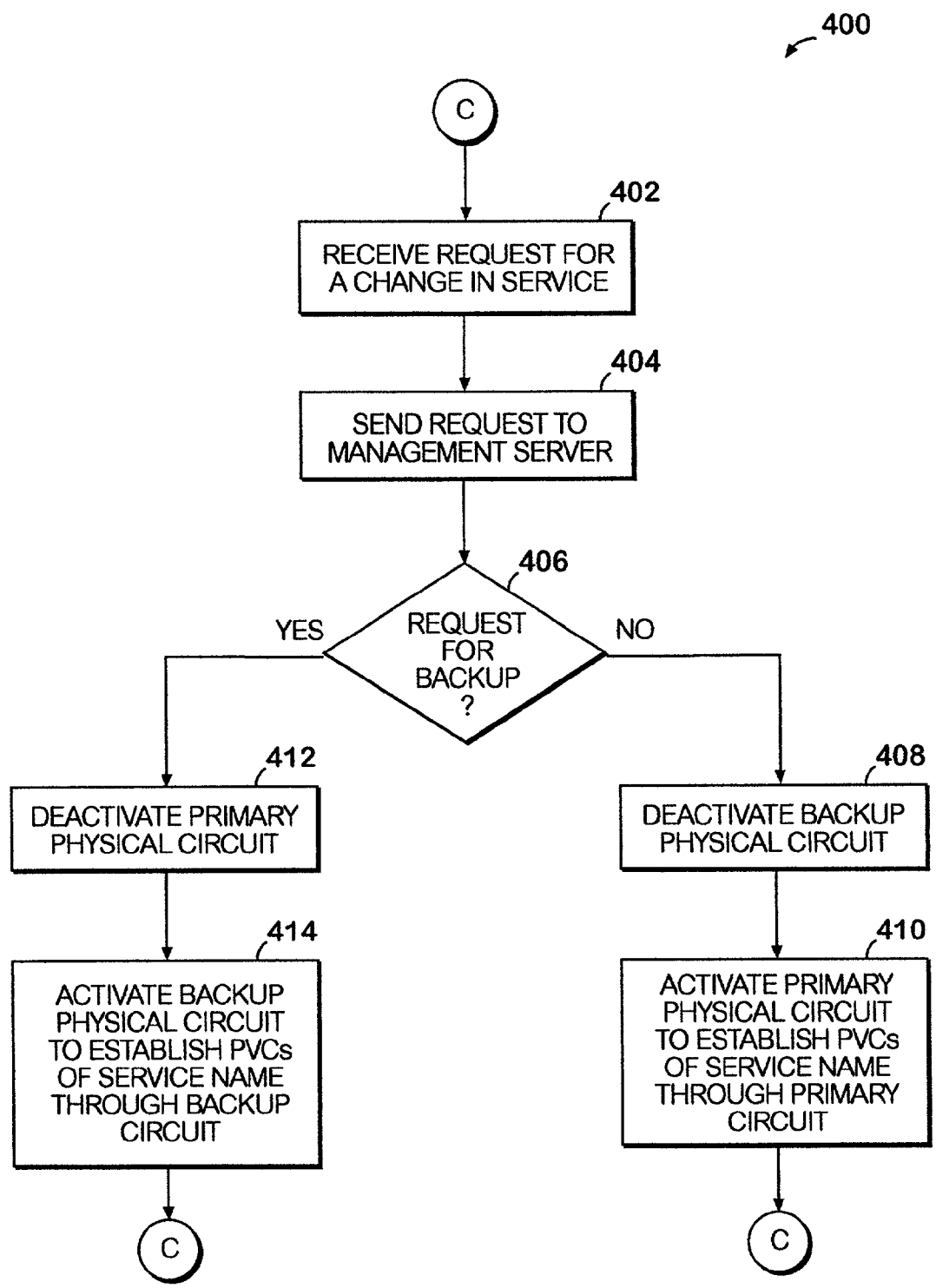
FIG. 5 is an operational flow for toggling between primary and backup LPort service.

FIG. 5 shows the operational flow that occurs when a user toggles between the primary LPort service and the backup LPort service configured through the operations of FIGS. 3 and 4. At receive operation 402, the management server 106 receives a request for a change in service. The request may be entered by a technician using the terminal 110. Alternatively, the host 104 or other computing device that communicates directly with the management server 106 through the Internet or other WAN connection may receive the request.

After the request for a change in service has been received, the terminal 110 or other device sends the request to the management server at send operation 404. The management server then determines whether the request is for backup LPort service to be implemented. If backup service is desired, then circuit operation 412 deactivates the primary LPort service through the primary physical circuit, and backup operation 414 activates the backup LPort service dictated by the backup MIB so that the host may begin transmitting and receiving data through the LPort of the backup physical circuit. If query operation 406 detects that primary operation is desired, then circuit operation 408 deactivates the backup physical circuit, and primary operation 410 activates the primary LPort service dictated by the primary MIB so that the host may begin transmitting and receiving data through the LPort of the primary physical circuit.

Although the present invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method for providing backup logical port service in a network, comprising:
    associating a service name to logical port information of a primary management information base that describes one or more permanent virtual circuits of a primary physical circuit;
    associating the logical port information through the service name to a backup management information base;
    applying the logical port information from the primary management information base to the primary physical circuit to establish the one or more permanent virtual circuits through the primary physical circuit when the primary physical circuit is active; and
    applying the logical port information of the backup management information base to a backup physical circuit to establish the one or more permanent virtual circuits through the backup physical circuit when the backup physical circuit is active.

2. The method of claim 1, wherein the primary and backup management information bases are maintained by a management server in communication with a user terminal, the primary physical circuit, and the backup physical circuit, the method further comprising:

receiving into the terminal the service name, a primary physical circuit name, and a backup physical circuit name; and transmitting the service name, primary physical circuit name, and backup physical circuit name to the management server.

3. The method of claim 1, wherein the primary and backup management information bases are maintained by a management server in communication with the primary physical circuit and the backup physical circuit, the method further comprising:

transmitting a command to make the backup physical circuit active to the management server;

deactivating the primary physical circuit at the management server; and activating the backup physical circuit at the management server.

4. The method of claim 3, wherein a host is linked to the primary and backup physical circuits, the method further comprising:

establishing a connection between the host and the management server; and transmitting the command from the host to the management server.

5. The method of claim 1, further comprising:

associating the primary physical circuit name to the permanent virtual circuit descriptions associated with the service name when the primary physical circuit is active; and associating the backup physical circuit name to the permanent virtual circuit descriptions associated with the service name when the backup physical circuit is active.

6. The method of claim 2, further comprising:

receiving into the terminal a full or partial backup selection;

receiving a selection of permanent virtual circuits to backup; and wherein the step of associating the logical port information through the service name to a backup management information base comprises associating the selection of permanent virtual circuits to the backup management information base.

7. The method of claim 2, further comprising:

detecting whether the primary management information base is already associated with a service name; and displaying an error indication at the terminal when the primary management information base is already associated with a service name.

8. The method of claim 2, further comprising:

detecting whether the backup physical circuit of the backup management information base exists; and displaying an error indication at the terminal when the backup physical circuit does not exist.

9. The method of claim 2, further comprising:

detecting whether the service name already exists; and displaying an error indication at the terminal when the service name already exists.

10. The method of claim 2, further comprising:

detecting whether the backup management information base describes working permanent virtual circuits of the backup physical circuit; and displaying an error indication at the terminal when the backup physical circuit has working permanent virtual circuits.

11. A network employing backup logical port service, comprising:

a management server containing a primary management information base storing logical port information describing permanent virtual circuits of a primary physical circuit, the management server being configured to receive a service name and a backup physical circuit name, associate the logical port information to the service name, and establish a backup management information base through association of the logical port information with the service name;

a primary physical circuit in communication with the management server and configured to establish the permanent virtual circuits of the primary management information base when activated by the management server; and a backup physical circuit in communication with the management server and configured to establish the permanent virtual circuits of the backup management information base when activated by the management server.

12. The network of claim 11, further comprising:

a terminal in communication with the management server, the terminal being configured to receive from a user and transmit to the management server the service name, a primary physical circuit name, and the backup physical circuit name, and the terminal being further configured to receive from a user a command to make the backup physical circuit active when the user desires backup logical port service.

13. The network of claim 12, wherein the terminal is further configured to receive a full or partial backup selection, receive a selection of permanent virtual circuits to backup, and wherein the management server is configured to associate the selection of permanent virtual circuits to the backup management information base through the service name.

14. The network of claim 12, wherein the management server is configured to detect whether the primary management information base is already associated with a service name and the terminal is configured to display an error indication at the terminal when the primary management information base is already associated with a service name.

15. The network of claim 12, wherein the management server is configured to detect whether the backup physical circuit corresponding to the backup management information base exists, and wherein the terminal is configured to display an error indication when the backup physical circuit does not exist.

16. The network of claim 12, wherein the management server is configured to detect whether the service name already exists, and wherein the terminal is further configured to display an error indication when the service name already exists.

17. The network of claim 12, wherein the management server is configured to detect whether the backup management information base indicates that the backup physical circuit has working permanent virtual circuits, and the wherein the terminal is configured to display an error indication when the backup physical circuit has working permanent virtual circuits.

18. The network of claim 11, further comprising:

a host device linked to the primary and backup physical circuits, the host device being in communication with the management server and being configured to send a command to the management server to make the backup physical circuit active when backup logical port service is desired.

19. A network employing backup logical port service, comprising:
   a management server containing a primary management information base having logical port information describing permanent virtual circuits of a primary physical circuit, the management server being configured to group a subset of the logical port information to a service name and establish a backup management information base through association of the subset of logical port information with the service name;
   a primary physical circuit in communication with the management server and configured to establish the permanent virtual circuits described by the logical port information of the primary management information base when activated by the management server; and
   a backup physical circuit in communication with the management server and configured to establish the permanent virtual circuits described by the subset of logical port information of the backup management information base when activated by the management server.

20. The network of claim 19, further comprising:
   a terminal in communication with the management server, the terminal being configured to receive from a user and transmit to the management server a service name, a primary physical circuit name, a backup physical circuit name, and a selection of virtual circuits for backup logical port service, and the terminal being further configured to receive a command to make the backup physical circuit active when the user desires backup logical port service.

21. The network of claim 20, wherein the management server is configured to detect whether the back up physical circuit exists and wherein the terminal is configured to display an error indication when the backup physical circuit does not exist.

22. The network of claim 20, wherein the management server is configured to detect whether the backup physical circuit has working permanent virtual circuits and wherein the terminal is configured to display an error indication when the backup physical circuit has working permanent virtual circuits.

23. The network of claim 19, further comprising:
   a host device linked to the primary and backup physical circuits, the host device being in communication with the management server and being configured to send a command to the management server to make the backup physical circuit active when backup logical port service is desired.

* * * * *